United States Patent
Schier et al.

(12) 
(10) Patent No.: US 6,584,252 B1
(45) Date of Patent: Jun. 24, 2003

(54) METHOD AND SYSTEM FOR PROVIDING FIBER OPTIC CABLE TO END USERS

(75) Inventors: John E. Schier, Austin, TX (US); Richard L. House, Round Rock, TX (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/737,309

(22) Filed: Dec. 14, 2000

(51) Int. Cl.[7] .............................................. G02B 6/00
(52) U.S. Cl. ....................................................... 385/100
(58) Field of Search ......................... 385/147, 24, 100; 405/154; 174/37, 38, 47

(56) References Cited

U.S. PATENT DOCUMENTS

| | | | | |
|---|---|---|---|---|
| 4,098,287 A | * | 7/1978 | Baumbuch | 137/362 |
| 4,647,251 A | * | 3/1987 | Gale | 405/154 |
| 5,002,438 A | * | 3/1991 | Strong | |
| 5,029,615 A | * | 7/1991 | Muller et al. | |
| 5,253,956 A | * | 10/1993 | Fisco et al. | 405/154 |
| 5,647,986 A | * | 7/1997 | Nawathe et al. | |
| 5,739,420 A | * | 4/1998 | Peterson | |
| 5,861,575 A | * | 1/1999 | Broussard | 174/20 |
| 5,862,561 A | * | 1/1999 | Irwin | |
| 5,996,159 A | * | 12/1999 | Irwin | |
| 6,091,872 A | * | 7/2000 | Katoot | |
| 6,167,916 B1 | * | 1/2001 | Gustafson, Jr. et al. | |
| 6,198,871 B1 | * | 3/2001 | Gregor | 385/147 |
| 6,215,930 B1 | * | 4/2001 | Estes | 385/100 |
| 6,301,414 B1 | * | 10/2001 | Liese et al. | 385/103 |
| 6,463,960 B1 | * | 10/2002 | Madhini | 174/47 |

FOREIGN PATENT DOCUMENTS

| | | | |
|---|---|---|---|
| DE | 19701787 | * | 7/1998 |
| JP | 8-41977 | * | 2/1996 |
| JP | 9-61640 | * | 3/1997 |
| JP | 2000-309976 | * | 11/2000 |

OTHER PUBLICATIONS

US 2001/0010136A1 Nakamura, Aug. 2001.*
US 2002/0114595A1 Potash, Aug. 2002.*

* cited by examiner

*Primary Examiner*—Neil Abrams
(74) *Attorney, Agent, or Firm*—Baker Botts L.L.P.

(57) ABSTRACT

According to one embodiment of the invention, a method for providing fiber optic cable to an end user includes disposing the fiber optic cable having first and second ends within a sewer line coupled to a premises of the end user, and coupling the first end of the fiber optic cable to a network interface device inside the premises. The method may further include disposing an optical splitter within a main sewer line coupled to the sewer line and coupling the second end of the fiber optic cable to the optical splitter.

10 Claims, 4 Drawing Sheets

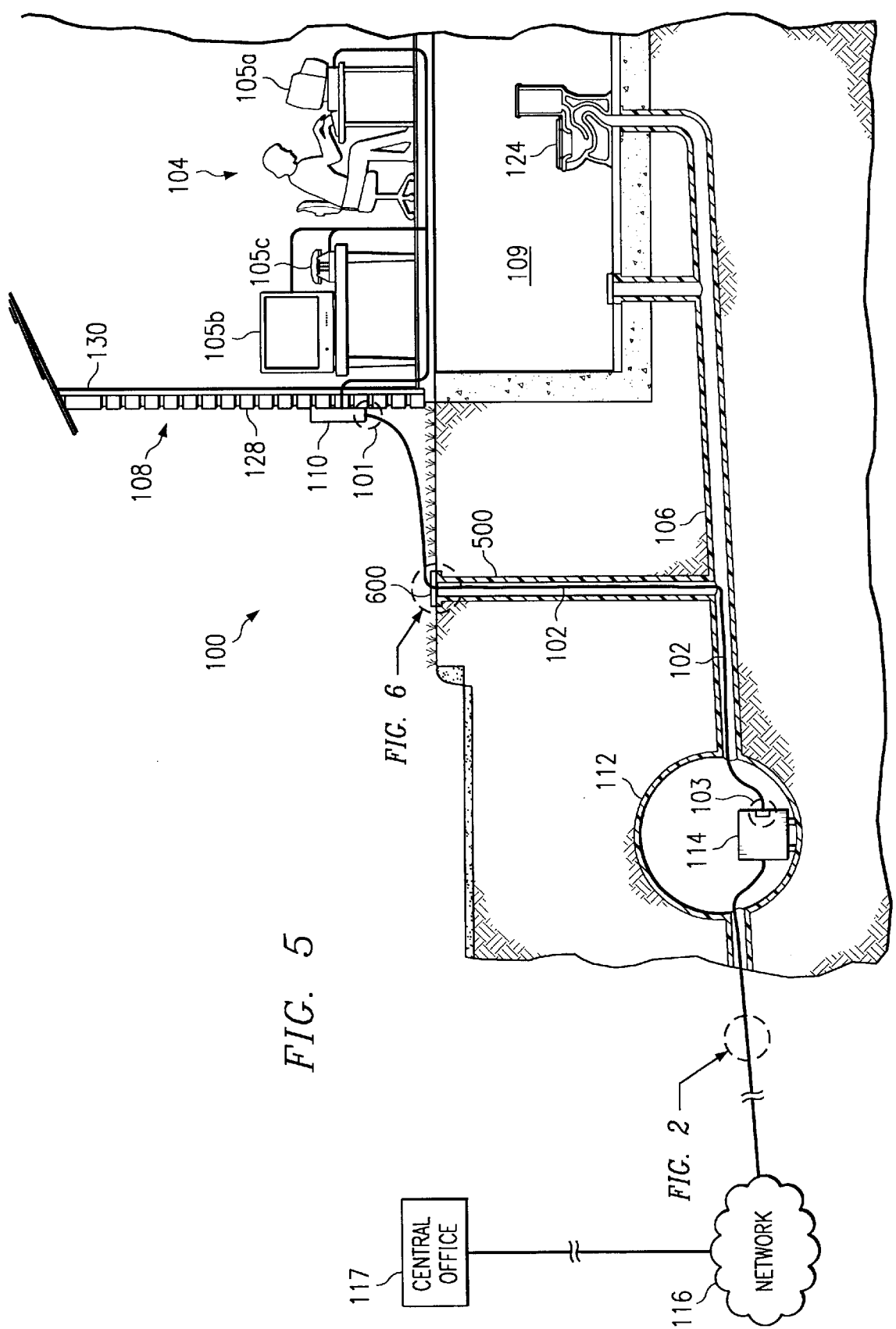

METHOD AND SYSTEM FOR PROVIDING FIBER OPTIC CABLE TO END USERS

TECHNICAL FIELD OF THE INVENTION

This invention relates generally to the field of fiber optic cable and, more specifically, to a method and system for providing fiber optic cable to end users.

BACKGROUND OF THE INVENTION

Demand for higher bandwidth communications and faster transport speeds to end users is exploding. Fiber optics is one of the most effective ways to deliver that high bandwidth and fast speed, but fiber optics is very expensive and difficult to provide to end users. Traditional copper cables (coaxial and twisted pair) are used to connect end users in residential areas to networks. Internet service providers, cable companies, and other carriers desire cost-effective and simple systems and methods for providing fiber optic cable to end users.

One method of providing fiber optic cable to end users is to bury it underground. However, installation of fiber optic cable underground is disruptive to neighborhoods and office areas because public streets and private property are excavated to some degree. In addition, before excavating streets and property, right-of-way contracts usually have to be negotiated, thereby wasting time. Another method of providing fiber optic cable to end users is to install it above ground on, for example, telephone poles next to telephone lines. However, this method is undesirable because of exposure to environmental conditions, such as wind, rain, and extreme temperatures. Other problems are the complexity of the existing infrastructure of telephone poles as well as undesirable aesthetics.

Some companies install fiber optic cable in existing infrastructures, such as water and gas lines. However, problems with water and gas lines are (1) they are under pressure; (2) the gas lines are dangerous to work with; (3) public concerns about having "foreign matter" in water supplies; and (4) the water and gas lines are relatively small and present difficulties in installing fiber optic cable. Still other companies install fiber optic cable in abandoned pipelines, abandoned hydraulic lines, or abandoned metropolitan sewer lines between office buildings. However, these methods are limited and none provide fiber optic cable to consumers and small business owners in residential locations.

SUMMARY OF THE INVENTION

The challenges in the field of fiber optic cable continue to increase with demands for more and better techniques having greater flexibility and adaptability. Therefore, a need has arisen for a new method and system for providing fiber optic cable to end users.

In accordance with the present invention, a method and system for providing fiber optic cable to end users is provided that addresses disadvantages and problems associated with previously developed methods and systems.

According to one embodiment of the invention, a method for providing a fiber optic cable to an end user includes disposing the fiber optic cable having first and second ends within a sewer line coupled to a premises of the end user, and coupling the first end of the fiber optic cable to a network interface device adjacent the premises.

Embodiments of the invention provide numerous technical advantages. For example, a technical advantage of one embodiment of the present invention is the utilization of existing sewer infrastructure, which allows fiber optic construction personnel to avoid excessive excavation of public or private property. Another technical advantage of one embodiment of the present invention is that most sewer lines are not under pressure, thereby minimizing the risk of leaks when tapping into sewer lines for access. A further technical advantage of one embodiment of the present invention is that installation equipment, while laying fiber optic cable, serves to clear any blockages in existing sewer lines. An additional technical advantage of one embodiment of the present invention is that a system permits cities to charge utilizing companies rental for use of sewer lines.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIG. 5 is a schematic diagram illustrating a system for providing fiber optic cable to end users in accordance with an alternative embodiment of the present invention;

DETAILED DESCRIPTION OF EXAMPLE EMBODIMENTS OF THE INVENTION

Example embodiments of the present invention and their advantages are best understood by referring now to FIGS. 1 through 8 of the drawings, in which like numerals refer to like parts.

Figure 1:
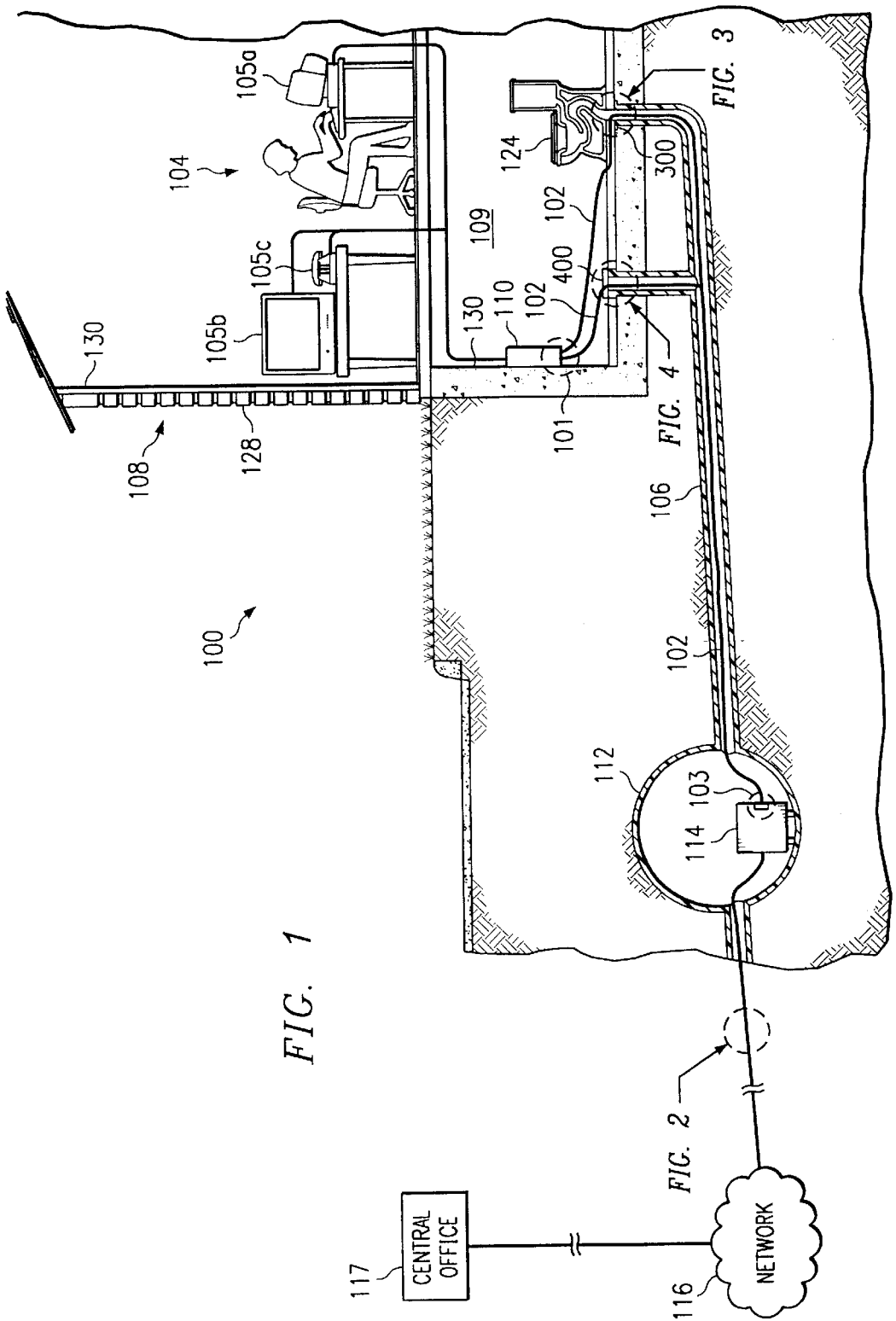
FIG. 1 is a schematic diagram illustrating a system for providing fiber optic cable to end users in accordance with one embodiment of the present invention.

FIG. 1 is a schematic diagram illustrating a system 100 for providing a fiber optic cable 102 to an end user 104 in accordance with one embodiment of the present invention. System 100 includes an end user sewer line 106 coupled to a premises 108 of end user 104, a network interface device ("NID") 110 adjacent premises 108, and fiber optic cable 102 disposed within end user sewer line 106, such that a first end 101 of fiber optic cable 102 couples to NID 110. System 100 may also include an optical splitter 114, a flange 300, and a water drain 400. Fiber optics is one of the most effective ways to deliver high bandwidth communications and fast transport speeds to end users 104. However, fiber optic cable is very expensive and difficult to provide to end users 104. Therefore, system 100 provides, in the embodiment shown in FIG. 1, fiber optic cable 102 to end users 104 utilizing end user sewer line 106.

Fiber optic cable 102, described in greater detail below in conjunction with FIG. 2, comprises an optical wave guide formed by any suitable arrangement of optically transmissive material that communicates optical signals as guided waves of energy. Fiber optic cable 102 is coupled to NID 110 at first end 101 for the purpose of connecting communication equipment of end user 104 to a central office 117 via a network 116.

NID 110 is adjacent premises 108 and, in one embodiment, couples to an inside 130 of premises 108; however, NID 110 may also couple to an outside 128 of premises 108. NID 110 is coupled to first end 101 of fiber optic cable 102 and is used to connect communication equipment of end user 104 to central office 117 via network 116. Network interface devices ("NID's") are well known in the art of communications and are used extensively by telephone companies. Examples of NID 110 are a CAC 600 or CAC 7600 Network Interface Device from Siecor®. NID 110 may also take the form of a gateway, which may be a wireless, HPNA, or power line gateway, or NID 110 may take the form of an optical network terminal. An example of NID 110 in the form of a gateway is an IAD-402 from Jetstream Communications, Inc.®

In one embodiment, premises 108 is a residence of end user 104, such as a home of a consumer; however, premises 108 may be an office building of a business owner. As shown in FIG. 1, premises 108 may include a basement 109. Alternatively, premises 108 may have either a crawl space or a foundation to serve as an interface with end user sewer line 106. Premises 108 houses communication equipment that is coupled to NID 110 for the purpose of connecting communication equipment of end user 104 to central office 117 via fiber optic cable 102 and network 116. Communication equipment may include any suitable type of communication equipment, such as a computer 105a, a television 105b, and a telephone 105c.

Central office 117 may be any suitable central office of a communications company, such as an internet service provider ("ISP") or cable company. Network 116 may be any suitable type of high speed backbone network such as an asynchronous transfer mode ("ATM") network, an internet protocol ("IP") network, or frame relay network.

As mentioned previously, system 100 provides fiber optic cable 102 to end users 104 utilizing end user sewer line 106. End user sewer line 106 is any suitable sewer line connecting premises 108 to main sewer line 112. In one embodiment, end user sewer line 106 is an eight inch diameter circular conduit made of a clay material (sometimes referred to as "clay tiles"); however, end user sewer line 106 may be formed in any suitable shape or size and may be formed from any type of material suitable for transporting sewage, such as polyvinyl chloride ("PVC") or other types of plastics. End user sewer line 106 may be any existing sewer line or newly installed sewer line that connects premises 108 to main sewer line 112. Utilizing end sewer line 106 to provide fiber optic cable 102 to end users 104 avoids having to tear up streets and private property to lay fiber optic cable 102. Typically, end user sewer line 106 is the property of end user 104 and runs underground from premises 108 to main sewer line 112. Main sewer line 112 is typically the property of a city or other municipality and typically exists under a public street, for example. Like end user sewer line 106, main sewer line 112 may be formed in any suitable shape or size and may be formed from any type of material suitable for transporting sewage.

In one embodiment of the present invention, system 100 includes optical splitter 114 operable to receive a second end 103 of fiber optic cable 102 for the purpose of connecting communication equipment of end user 104 to central office 117 via a network 116. Optical splitter 114 may be either powered or passive. As described more fully below in conjunction with FIG. 7, optical splitter 114 may also serve multiple end users 104 by providing multiple fiber optic cables 102 to multiple premises 108. In one embodiment, optical splitter 114 is an OPTera Connect PX Connection Manager from Nortel Networks™; however, optical splitter 114 may be any suitable type of powered or passive optical cross-connect or optical switch. In one embodiment, optical splitter 114 is disposed within a main sewer line 112. For quality, reliability, and maintenance purposes, optical splitter 114 should be secured to an inside wall of main sewer line 112 and should be able to withstand the environment existing in main sewer line 112. Optical splitter 114 is operable to couple second end 103 of fiber optic cable 102 to central office 117 via network 116.

Figure 3:
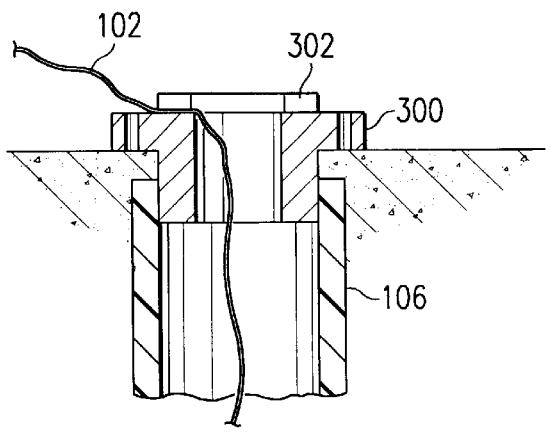
FIG. 3 is a cross-sectional view of a flange and a wax ring illustrating a fiber optic cable exiting adjacent the flange in accordance with one embodiment of the present invention.
Figure 4:
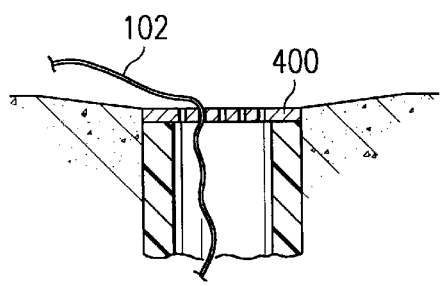
FIG. 4 is a cross-sectional view of a water drain illustrating a fiber optic cable exiting adjacent the water drain in accordance with one embodiment of the present invention.

In an embodiment where NID 110 is coupled to inside 130 of premises 108, system 100 includes flange 300 (FIG. 3) and/or water drain 400 (FIG. 4). In one embodiment, flange 300 is disposed beneath a toilet 124 located in premises 108; however, flange 300 may exist in any suitable location in premises 108. Toilet 124 may be located in any suitable location of premises 108, and as shown in FIG. 1 may exist in basement 109. In one embodiment, water drain 400 is located in basement 109 of premises 108; however, water drain 400 may exist in any suitable location in premises 108. Water drain 400 is an interface for end user sewer line 106 and waste water coming from, for example, a washer or shower.

Figure 2:
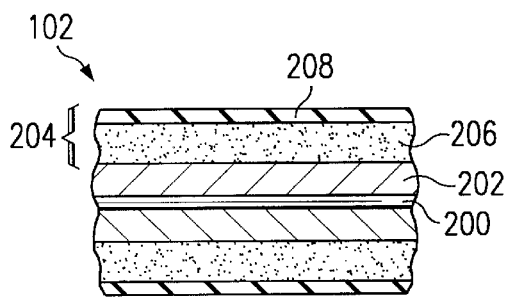
FIG. 2 is a cross-sectional view of the fiber optic cable illustrated in FIG. 1.

FIG. 2 is a cross-sectional view of fiber optic cable 102. As described above in conjunction with FIG. 1, fiber optic cable 102 comprises an optical waveguide formed by any suitable arrangement of optically transmissive material that communicates optical signals as guided waves of energy. In one embodiment, fiber optic cable 102 includes a core 200 designed to transmit or receive information in the form of light pulses, and a cladding 202 that surrounds core 200 to prevent signals from escaping during transmission. In another embodiment, fiber optic cable 102 comprises a planar waveguide formed in an appropriate refractive material. Optical signals comprise visible light, infrared radiation, ultra-violet radiation, or any other suitable optical beam.

Core 200 of fiber optic cable 102 comprises any suitable refractive material, such as glass, having a particular index of refraction. Cladding 202 of fiber optic cable 102 comprises any suitable refractive material, such as glass, having an index of refraction lower than that of core 200 such that a signal propagates along the longitudinal axis of fiber optic cable 102. Fiber optic cable 102 may comprise a multi-mode fiber having a large core (e.g., 50 or 62.5 microns wide) or a single mode fiber having a small core (e.g., 9 microns wide). Although the following description is detailed with reference to fiber optic cable 102 having a circular cross-section, it should be understood that the cross-section of fiber optic cable 102 may have any suitable shape, including, but not limited to, an oval or a circle having grooves or notches.

Because fiber optic cable 102 is disposed within end user sewer line 106, it is important that fiber optic cable 102 be compatible with the environment existing within end user sewer line 106, especially if end user sewer line 106 is an active sewer line. Therefore, in one embodiment, fiber optic cable includes a sheathing 204 to protect fiber optic cable 102 from chemicals and abrasives found in end user sewer line 106. In one embodiment, sheathing 204 includes a protective gel 206 and an outer cover 208; however, sheathing 204 may be any suitable sheathing having an ability to withstand an environment in end user sewer line 106. Protective gel 206 is any suitable gel used to patch holes or tears in outer cover 208. For example, protective gel 206 may be the type of gel used in run flat tires in automotive applications. Outer cover 208 may be any suitable type of covering formed from any suitable type of material, such as plastic or rubber.

The teachings of the present invention realize that communications media other than fiber optic cable 102 can be provided to end user 104, such as, for example, coaxial or twisted pair copper cable.

FIG. 3 is a cross-sectional view of flange 300 and a wax ring 302 illustrating fiber optic cable 102 exiting adjacent flange 300 in accordance with one embodiment of the present invention. In one embodiment, flange 300 is disposed beneath toilet 124 (not shown) and is operable to allow first end 101 (FIG. 1) of fiber optic cable 102 to exit adjacent flange 300 and couple to NID 110. However, fiber optic cable 102 may exit end user sewer line 106 in other openings inside premises 108, such as between flange 300 and wax ring 302 that is typically used for sealing purposes beneath toilets.

FIG. 4 is a cross-sectional view of water drain 400 illustrating fiber optic cable 102 exiting adjacent water drain 400 in accordance with one embodiment of the present invention. In one embodiment, water drain 400 is operable to allow fiber optic cable 102 to exit adjacent water drain 400 and couple to NID 110. In this embodiment, first end 101 (FIG. 1) of fiber optic cable 102 exits end user sewer line 106 adjacent water drain 400 before coupling to NID 110, which may be located in any suitable location inside basement 109. As described above in conjunction with FIG. 3, fiber optic cable 102 may exit end user sewer line 106 in other openings inside premises 108, such as adjacent a shower drain.

FIG. 5 is a schematic diagram illustrating an alternative embodiment of system 100 for providing fiber optic cable 102 to end user 104. As described above in conjunction with FIG. 1, system 100 includes end user sewer line 106 coupled to premises 108 of end user 104, NID 110 adjacent premises 108, and fiber optic cable 102 disposed within end user sewer line 106, such that first end 101 of fiber optic cable 102 couples to NID 110. These elements are described above in conjunction with FIG. 1 and will not be described again. In the embodiment shown in FIG. 5, system 100 also includes a clean-out riser 500.

Clean-out riser 500 is coupled to an intermediate portion of end user sewer line 106 as shown in FIG. 5. In one embodiment, clean-out riser 118 includes a cover 600 (FIG. 6) operable to allow first end 101 of fiber optic cable 102 to exit adjacent cover 600 and couple to NID 110, which in this embodiment is coupled to outside 128 of premises 108. However, first end 101 of fiber optic cable 102 may also exit through other openings outside of premises 108. Clean-out riser 500 may already be existing in some end user sewer lines 106 or may be newly installed. For example, clean-out riser 500 may exist in a front yard of end user 104, and may be at, or below, ground level.

Figure 6:
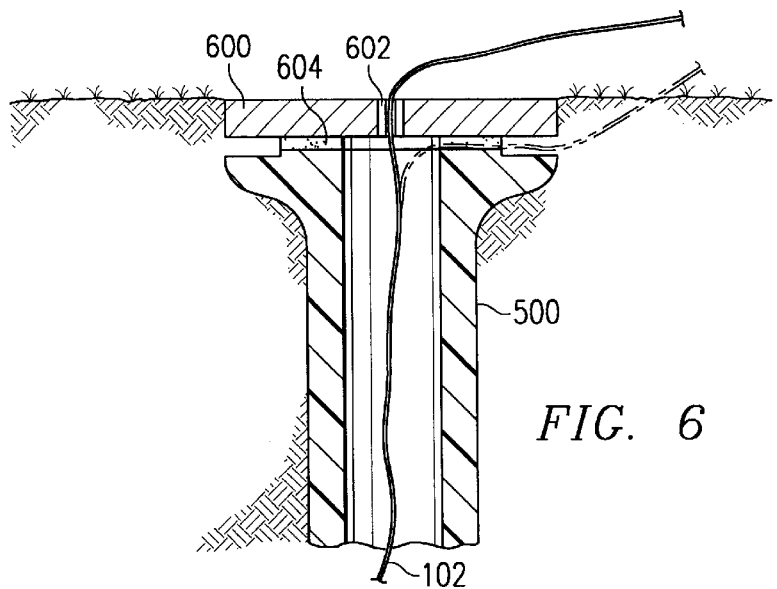
FIG. 6 is a cross-sectional view of a clean-out riser having a cover illustrating a fiber optic cable exiting adjacent the cover in accordance with the embodiment of the present invention as illustrated in FIG. 5.

FIG. 6 is a cross-sectional view of clean-out riser 500 having cover 600 illustrating fiber optic cable 102 exiting adjacent cover 600 and coupling to NID 110 in accordance with the embodiment illustrated in FIG. 5. In one embodiment, first end 101 (FIG. 1) of fiber optic cable 102 exits cover 600 through a rubber plug 602 disposed within a portion of cover 600; however, fiber optic cable 102 may exit adjacent cover 600 in other ways, such as adjacent a gasket 604 that is disposed between cover 600 and clean-out riser 500.

Figure 7:
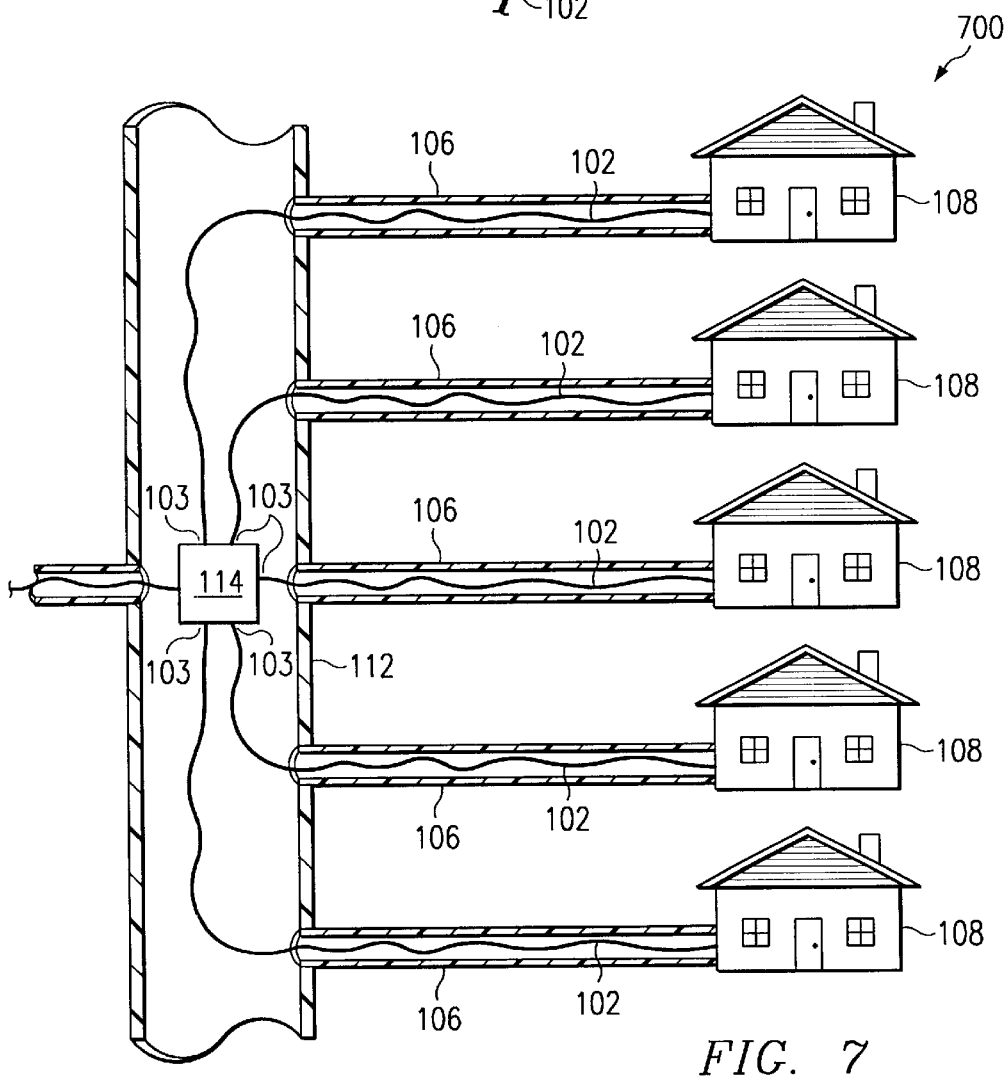
FIG. 7 is a schematic diagram illustrating a system for providing fiber optic cable to multiple end users in accordance with one embodiment of the present invention.

FIG. 7 is a schematic diagram illustrating a system 700 for providing fiber optic cable 102 to a plurality of end users 104 (not shown) in accordance with one embodiment of the present invention. System 700 includes optical splitter 114 disposed within main sewer line 112, a plurality of fiber optic cables 102 disposed within a plurality of end user sewer lines 106, and a plurality of premises 108. As described above in conjunction with FIG. 1, optical splitter 114 is operable to receive second ends 103 of fiber optic cable 102 for the purpose of connecting communication equipment of end users 104 to central office 117 via network 116. In one embodiment, optical splitter 114 is an OPTera Connect PX Connection Manager from Nortel Networks™; however, optical splitter 114 may be any suitable type of powered or passive optical cross-connect or optical switch. Main sewer line 112, fiber optic cable 102, end user sewer line 106, and premises 108 are described above and will not be further described in conjunction with FIG. 7.

Figure 8:
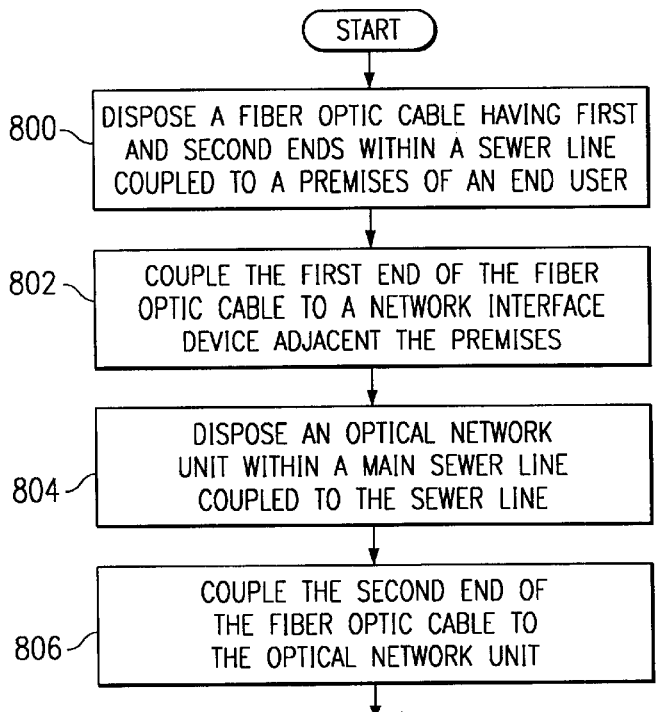
FIG. 8 is a flowchart demonstrating one method for providing fiber optic cable to end users in accordance with the present invention.

FIG. 8 is a flowchart demonstrating one method of providing fiber optic cable 102 to end users 104 in accordance with the present invention. Fiber optic cable 102 having first end 101 and second end 103 is disposed within end user sewer line 106 at step 800. End user sewer line 106 is coupled to premises 108 at any suitable location.

In one embodiment, fiber optic cable 102 is installed using a plumbing snake, which is well known in the art of plumbing and sewer systems. For example, an end of a plumbing snake may enter end user sewer line 106 at flange 300 and be extended all the way to main sewer line 112. At that point, first end 101 of fiber optic cable 102 is coupled to the plumbing snake and plumbing snake is retracted until it exits flange 300. Plumbing snake should be restricted from rotating in end user sewer line 106 to avoid destroying fiber optic cable 102. The same procedure may be used if fiber optic cable 102 is being installed in clean-out riser 500 or if it is desired to exit out of water drain 400. As another example, a plumbing snake is used to essentially push fiber optic cable 102 through end user sewer line 106. In this example, a plumbing snake may exist in main sewer line 112 and first end 101 of fiber optic cable 102 is attached to the end of the plumbing snake before the plumbing snake is extended through end user sewer line 106 until the plumbing snake reaches its desired destination, which may be either flange 300, water drain 400, or clean-out riser 500.

Other methods may be used to install fiber optic cable 102 in end user sewer line 106. For example, a "crawler" may be utilized. A crawler is a small electromechanical device typically powered by batteries and guided by radio frequencies, which couples to first end 101 of fiber optic cable 102 and essentially crawls its way through any conduit or sewer line. No matter what procedure or method is used to install fiber optic cable 102 in end user sewer line 106, first end 101 of fiber optic cable 102 is coupled to NID 110 at step 802. NID 110 is provided adjacent premises 108 of end user 104, and may be coupled to either outside 128 or inside 130 of premises 108. This essentially ends one method of providing fiber optic cable 102 to end users 104.

However, in an alternative method of providing fiber optic cable 102 to end users 104, optical splitter 114 is disposed with main sewer line 112 at step 804. As described above in conjunction with FIG. 1, optical splitter 114 should be secured to an inside wall of main sewer line 112 and should be able to withstand the environment existing in main sewer line 112. Once optical splitter 114 is disposed within main sewer line 112, second end 103 of fiber optic cable 102 is coupled to optical splitter 114 at step 806, thereby ending an alternative method of providing fiber optic cable 102 to end users 104.

Although embodiments of the invention and their advantages are described in detail, a person skilled in the art could make various alternations, additions, and omissions without departing from the spirit and scope of the present invention as defined by the appended claims.

What is claimed is:

1. A method for providing a fiber optic cable to an end user, the method comprising:

disposing the fiber optic cable having first and second ends within a sewer line coupled to a premises of the end user;

disposing the first end of the fiber optic cable between a flange and a seal disposed beneath a toilet located inside the premises; and coupling the first end of the fiber optic cable to a network interface device inside the premises of the end user.

2. The method of claim 1, further comprising:

disposing an optical splitter within a main sewer line coupled to the sewer line; and coupling the second end of the fiber optic cable to the optical splitter, the optical splitter operable to couple the end user to a central office via a network.

3. The method of claim 2, wherein disposing an optical splitter within a main sewer line comprises disposing the optical splitter within the main sewer line wherein the optical splitter is operable to couple a plurality of end users to a central office via a network.

4. The method of claim 1, further comprising providing a sheathing for the fiber optic cable that is compatible with an environment of an active sewer line.

5. A method for providing a fiber optic cable to an end user, the method comprising:

disposing the fiber optic cable having first and second ends within a sewer line coupled to a premises of the end user;

feeding the first end of the fiber optic cable between a flange and a seal disposed beneath a toilet located inside the premises; and coupling the first end of the fiber optic cable to a network interface device inside the premises of the end user.

6. The method of claim 5, further comprising:

disposing an optical splitter within a main sewer line coupled to the sewer line; and coupling the second end of the fiber optic cable to the optical splitter, the optical splitter operable to couple the end user to a central office via a network.

7. The method of claim 6, wherein disposing an optical splitter within a main sewer line comprises disposing the optical splitter within the main sewer line wherein the optical splitter is operable to couple a plurality of end users to a central office via a network.

8. The method of claim 5, further comprising providing a sheathing for the fiber optic cable that is compatible with an environment of an active sewer line.

9. A method for providing a copper cable to an end user, the method comprising:

disposing the copper cable having first and second ends within a sewer line coupled to a premises of the end user;

feeding the first end of the copper cable between a flange and a seal disposed beneath a toilet located inside the premises; and coupling the first end of the copper cable to a network interface device inside the premises of the end user.

10. A method for providing a fiber optic cable to an end user, the method comprising:

means for disposing the fiber optic cable having first and second ends within a sewer line coupled to a premises of the end user;

flange and seal means disposed beneath a toilet located inside the premises for feeding the first end of the fiber optic cable therethrough; and means for coupling the first end of the fiber optic cable to a network interface device inside the premises of the end user.

* * * * *